UNITED STATES PATENT OFFICE.

JOHN GRIFFITH BURGESS, OF SAN DIEGO, CALIFORNIA.

VEGETABLE HAIR-TONIC.

961,840.  Specification of Letters Patent.  Patented June 21, 1910.

No Drawing.  Application filed September 14, 1909. Serial No. 517,717.

*To all whom it may concern:*

Be it known that I, JOHN GRIFFITH BURGESS, a citizen of the United States, residing in San Diego, county of San Diego, and State of California, have invented a Vegetable Hair-Tonic, of which the following is a specification.

My invention consists of all the following ingredients compounded in the manner and proportions stated, viz: *Larrea divaricata* (infusion 1 lb. leaves to 12 lbs. water) 92 parts, grain alcohol 7 parts, and either of the following: Extract rose leaves, extract violet, oil rosemary, 1 part.

The infusion of *Larrea divaricata* is made by boiling at a low heat for several hours in a closed receptacle and then straining the same to remove the residual matter. When cold the alcohol and one of the perfuming ingredients are added and the whole thoroughly mixed by agitation.

It has been demonstrated by actual use that this preparation will grow hair on man and animals, will remove dandruff, will destroy germs of eczema and salt rheum, will preserve the hair already on the head, will act as a styptic and antiseptic on wounds, sores, and skin diseases, and is a germicide and disinfectant.

While this composition as described is well adapted to accomplish the results as stated it is to be understood that it is not limited to the precise proportion of ingredients as here given, but may have greater or less quantities of the materials as may be deemed expedient for the purposes of the invention.

What I claim is:

1. A composition consisting of an infusion of *Larrea divaricata*, grain alcohol, and a perfume substantially as described and for the purpose specified.

2. A composition consisting of an infusion of *Larrea divaricata*, prepared from one pound of leaves and 12 pounds of water, 92 parts, grain alcohol, 7 parts, and a perfume 1 part, substantially as described and for the purpose specified.

In testimony whereof, I affix my signature, in presence of two witnesses.

JOHN GRIFFITH BURGESS.

Witnesses:
J. W. MASTER,
H. MACNIDER.